No. 626,900. Patented June 13, 1899.
W. H. GIBBS.
HEDDLE MAKING MACHINE.
(Application filed July 26, 1895.)
(No Model.) 6 Sheets—Sheet 1.

Fig. 1.

Witnesses: Inventor.
W. H. Gibbs
By
Southgate & Southgate
Attorneys.

No. 626,900. Patented June 13, 1899.
W. H. GIBBS.
HEDDLE MAKING MACHINE.
(Application filed July 26, 1895.)

(No Model.) 6 Sheets—Sheet 2.

Fig. 2.

Witnesses:
Inventor.
W. H. Gibbs,
By
Southgate & Southgate
Attorneys

No. 626,900. Patented June 13, 1899.
W. H. GIBBS.
HEDDLE MAKING MACHINE.
(Application filed July 26, 1895.)
(No Model.) 6 Sheets—Sheet 4.

Witnesses:
Inventor.
W. H. Gibbs,
By
Southgate & Southgate
Attorneys

No. 626,900. Patented June 13, 1899.
W. H. GIBBS.
HEDDLE MAKING MACHINE.
(Application filed July 26, 1895.)

(No Model.) 6 Sheets—Sheet 5.

Witnesses:
Chas. F. Schmelz
W. J. Baldwin

Inventor.
W. H. Gibbs,
By
Southgate & Southgate
Attorneys

THE NORRIS PETERS CO., PHOTO-LITHO., WASHINGTON, D. C.

No. 626,900. Patented June 13, 1899.
W. H. GIBBS.
HEDDLE MAKING MACHINE.
(Application filed July 26, 1895.)
(No Model.) 6 Sheets—Sheet 6.

Witnesses.
Chas. F. Schmelz
W. L. Baldwin

Inventor.
W. H. Gibbs,
By
Southgate & Southgate
Attorneys

THE NORRIS PETERS CO., PHOTO-LITHO., WASHINGTON, D. C.

UNITED STATES PATENT OFFICE.

WILLIAM H. GIBBS, OF CLINTON, MASSACHUSETTS, ASSIGNOR TO THE GIBBS LOOM, HARNESS AND REED COMPANY, OF SAME PLACE.

HEDDLE-MAKING MACHINE.

SPECIFICATION forming part of Letters Patent No. 626,900, dated June 13, 1899.

Application filed July 26, 1895. Serial No. 557,179. (No model.)

*To all whom it may concern:*

Be it known that I, WILLIAM H. GIBBS, a citizen of the United States, residing at Clinton, in the county of Worcester and State of Massachusetts, have invented a new and useful Improvement in Heddle-Machines, of which the following is a specification.

My invention relates to a machine for making heddles; and the object of my invention is to provide an automatic power-driven machine for making and finishing wire heddles of substantially the construction illustrated in Letters Patent of the United States to Hermann Vogelsang, No. 527,165, granted October 9, 1894.

To these ends my invention consists of the parts and combinations of parts, as hereinafter described, and more particularly pointed out in the claims at the end of this specification.

In the accompanying six sheets of drawings.

As illustrated, a heddle-machine constructed according to my invention comprises a cutting and feeding mechanism for feeding a wire blank of the required length into position to be operated upon by a heddle-forming mechanism, conveying devices for removing the heddles from the heddle-forming mechanism and presenting the same to a trimming or finishing mechanism, a trimming or finishing mechanism for cutting off the projecting wire ends, and a delivery mechanism for delivering the completed heddles from the machine.

I will now proceed to describe the various groups of instrumentalities which go to make up my complete machine, it being understood that I do not mean by this description of specific details to at all limit the broad terms used in the claims to such details.

Referring to the drawings, A designates a bed-plate or casting, which may be carried upon or supported by suitable legs, as $a$. Extending longitudinally with respect to the bed-plate and journaled in suitable brackets thereon are two cam-shafts 25 and 26. Supported in suitable hangers near the front of the bed-plate is a third cam-shaft 28. Journaled near the rear of the bed-plate is a driving-shaft 29, to which power may be applied in any ordinary manner. The cam-shafts 25, 26, and 28 are connected to the driving-shaft 29 by suitable gearing, as hereinafter described, and the operative parts of the machine are all actuated either from the cam-shafts 25, 26, or 28 or from the driving-shaft 29.

Figure 5:
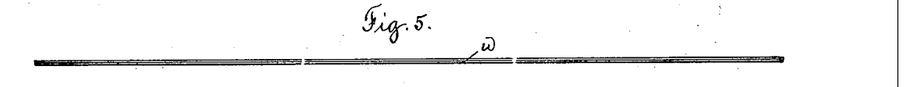
Figs. 5, 6, 7, 8, and 9 are detail views illustrating the different steps in the formation of a heddle.

Mounted upon and supported by the bed-plate A, near one end of the machine, is a frame or casing 33. Journaled in the casing 33 is a pair of constantly-running feed-rolls 30 and 31, which are geared to turn together. The wire $w$, which I employ in a heddle-machine constructed according to my invention, consists of two parallel strands which are brazed or soldered together, as illustrated in Fig. 5. The wire $w$ may be taken from any suitable source of supply—as, for instance, from a suitable reel—and is passed between the constantly-running feed-rolls 30 and 31.

Mounted in the casing 33 I provide a knife or cutter 34 for cutting off blanks or strips of wire of the required length. As illustrated, the knife or cutter 34 is provided near its lower end with a roller 35, which rests upon and engages a cam 36, fastened upon the cam-shaft 25. By means of this construction it will be seen that when the cutter 34 is in its raised position it will close the channel or passage for the wire through the casing 33 and will act as a stop, the feed-rolls then turning or slipping upon the wire $w$ without advancing the same. When the cutter 34 is allowed to move down under the tension of a spring, as shown, the passage for the wire will be opened and the wire will be advanced by the feed-rolls 30 and 31 until brought into contact with an adjustable stop 32, fixed upon the bed-plate of the machine. The section of the wire which has been thus advanced will then be cut off by the knife 34 and will be left in position to be acted upon by the heddle-forming mechanism.

Figure 6:
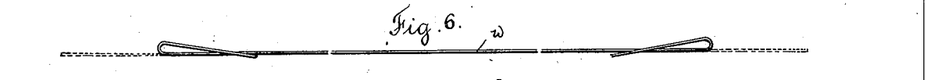
Figures 7, 8:
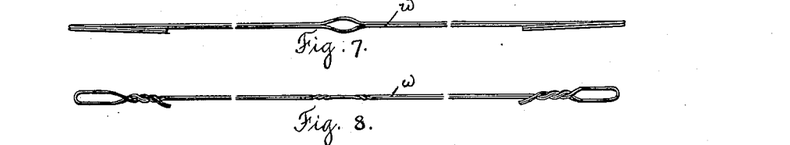
Figure 9:
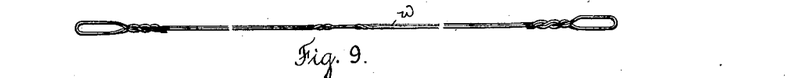

The heddle-forming mechanism which I preferably employ comprises bending devices or parts which I term the "end-benders" for bringing the ends of a wire blank back upon the central portion thereof to form the end loops of a heddle, as illustrated in Fig. 6, a reciprocating punch for separating the strands of the wire blank to form a central or thread-receiving eye, as illustrated in Fig. 7, and twisting-jaws for imparting the desired twists to the body portion of the heddle, as illustrated in Fig. 8.

The bending devices or end-benders for forming the loops or eyes at the ends of the heddles are substantially duplicates of each other.

Figures 12, 13:
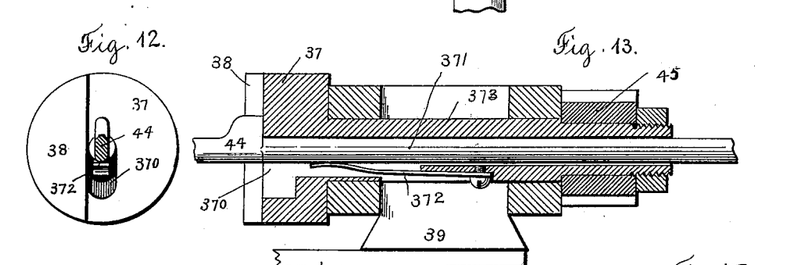
Figs. 12 and 13 are detail views of one of the parts which I term the "end-benders.
Figure 14:
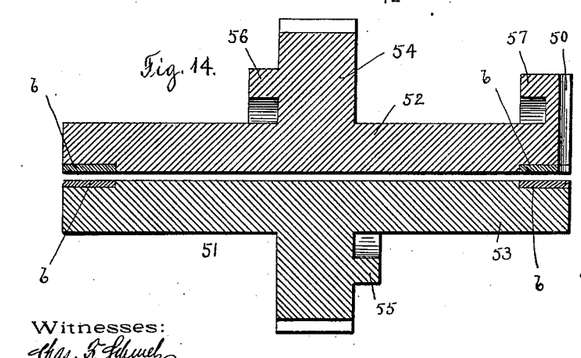
" Figs. 14 and 15 are detail views of a pair of twisting-jaws.
Figure 15:
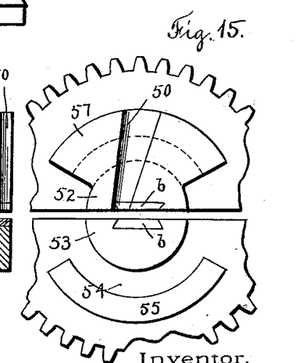

Referring to the drawings, 37 designates the end-benders, which are provided with projecting shoulders 38 for engaging with the wire $w$ and are journaled in slides 39, which are mounted in brackets 40, fixed upon the bed-plate A. As illustrated in Figs. 12 and 13, suitable eye-formers or mandrels 44 are arranged to project from the end-benders 37 in position to coöperate with the bending-shoulders 38. The formers 44 are formed integrally with shanks or spindles 371, which extend loosely through the spindles 373 of the end-benders 37. Springs 372 are arranged to bear upon and engage with the spindles 371, and by means of this construction the eye-formers or mandrels 44 are so mounted that they may yield or be drawn slightly toward each other to allow for the "take up" of the wire during the twisting operation, as hereinafter described. Chambers or recesses, as 370, are formed in the faces of the end-benders 37 in order to allow the mandrels or formers 44 to be slightly retracted or withdrawn from the eyes of the finished heddle, as hereinafter described.

Figure 18:
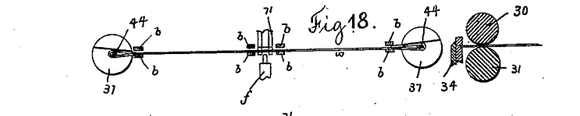
Figure 19:
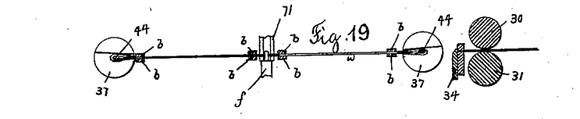
Figure 20:
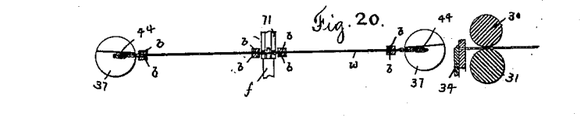
Figures 21, 22:
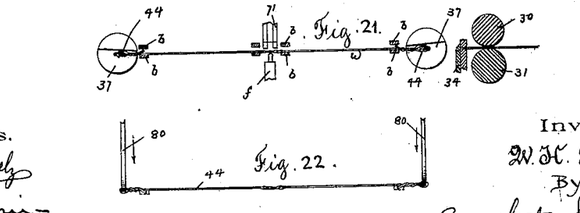

The slides 39, which carry the end-benders 37, are provided with projections or arms 41, having rollers 42 journaled thereon in position to engage with cams 43, secured upon the cam-shaft 25, and these parts are so timed that when the wire blank is fed into position to be engaged by the heddle-forming mechanism the slides 39 are in their raised position and the wire assumes a position below the formers 44. The slides 39 are then moved downward by cams 43, thus bringing the formers or mandrels 44 in line with the wire blank, as illustrated in Fig. 18. The end-benders 37 are then turned to bend the ends of the wire around the formers 44. The gearing for performing this function, as illustrated, consists of pinions 45, fastened upon the spindles 373 of the end-benders. Meshing with and actuating the pinions 45 are racks 46, which are connected to arms 47, which are pivoted at their lower ends to arms or levers 48, having rollers journaled thereon in position to engage with and bear upon cams 49, fastened upon the rear cam-shaft 26. By means of this construction the end-benders will be brought into proper position and will be oscillated to bend over the ends of the wire-blank to form the end loops of the heddles, the ends of the wire being guided by inclined grooves 50, formed in the outer faces of the twisting-jaws, so that the same will be brought into position to be engaged by said twisting-jaws when the said jaws are closed, as hereinafter described.

To form the central or thread-receiving eye of the heddle, I preferably provide a reciprocating former or chisel $f$, which is mounted in a bracket 70, secured to the base-plate A, and has a roller journaled near the lower end thereof, which engages with the groove in a box-cam 74, fastened upon the cam-shaft 25. Coöperating with the chisel or former $f$ I provide a center guide 71, which is mounted in the bracket 70 and is connected by a rod 72 to move with slides 58, which I employ for opening and closing the twisting-jaws. Near its lower end the center guide 71 is provided with pivoted spring-guiding jaws 73, and by means of this construction the wire blank will be accurately brought to position to coöperate with the chisel or former $f$.

Figure 1:
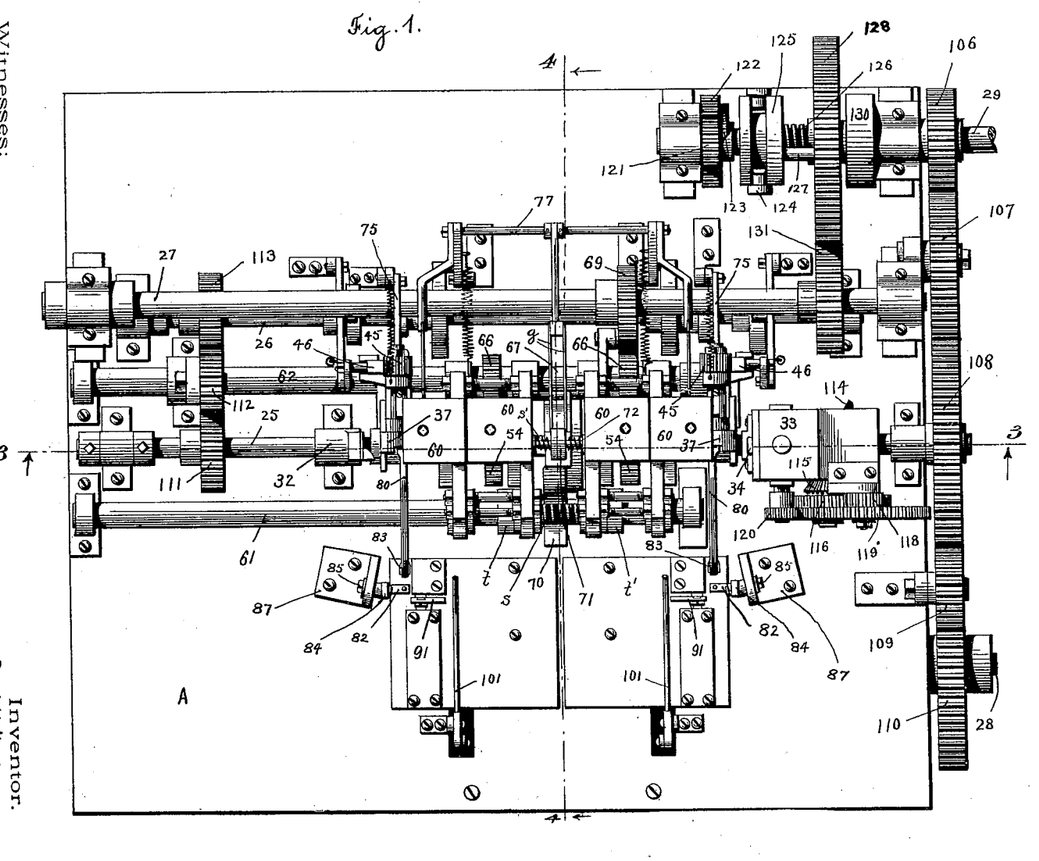
Figure 1 is a plan view of a heddle-machine constructed according to my invention.
Figure 2:
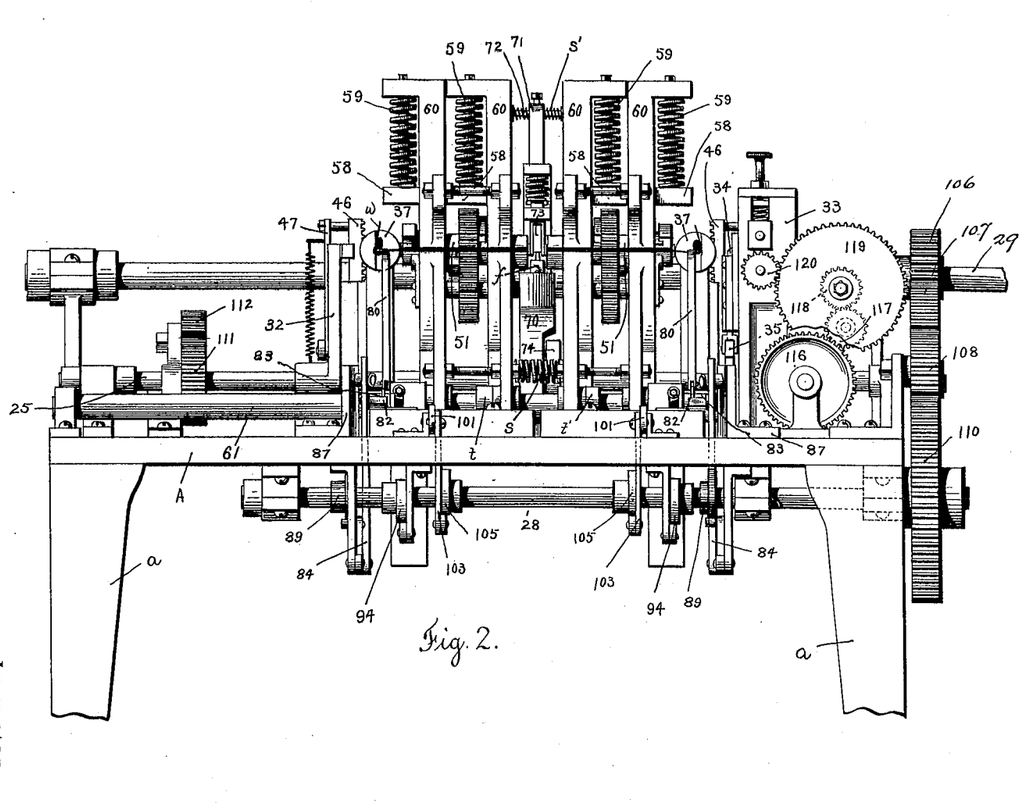
Fig. 2 is a side elevation of the same.
Figure 3:
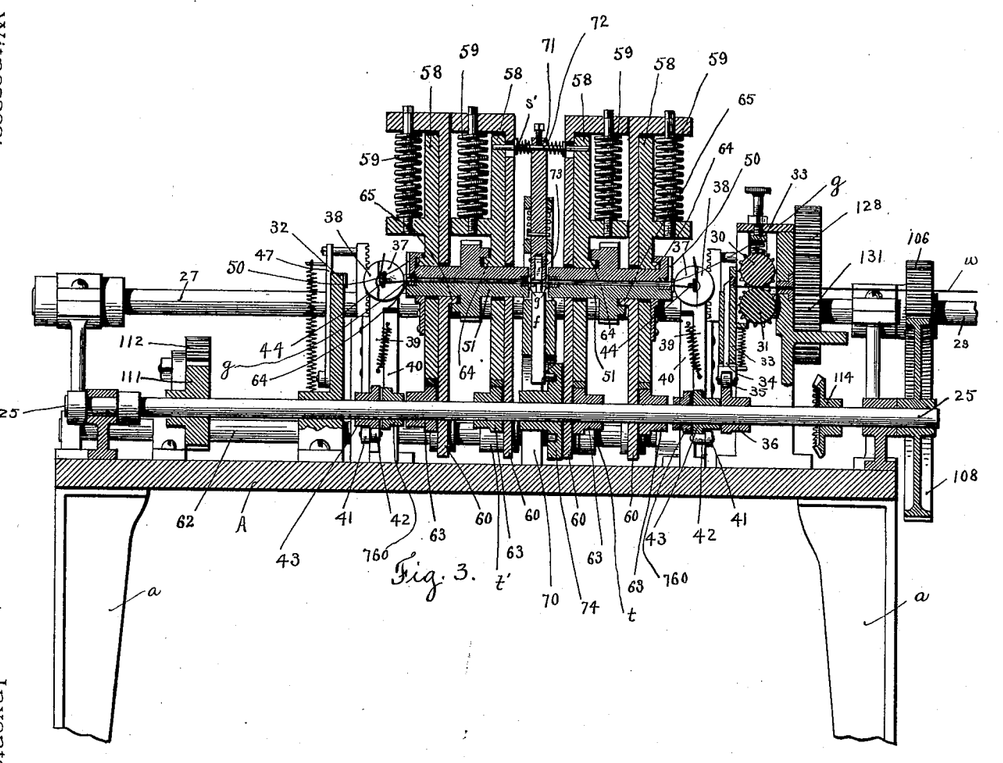
Fig. 3 is a longitudinal sectional view taken on the line 3 3 of Fig. 1.
Figure 4:
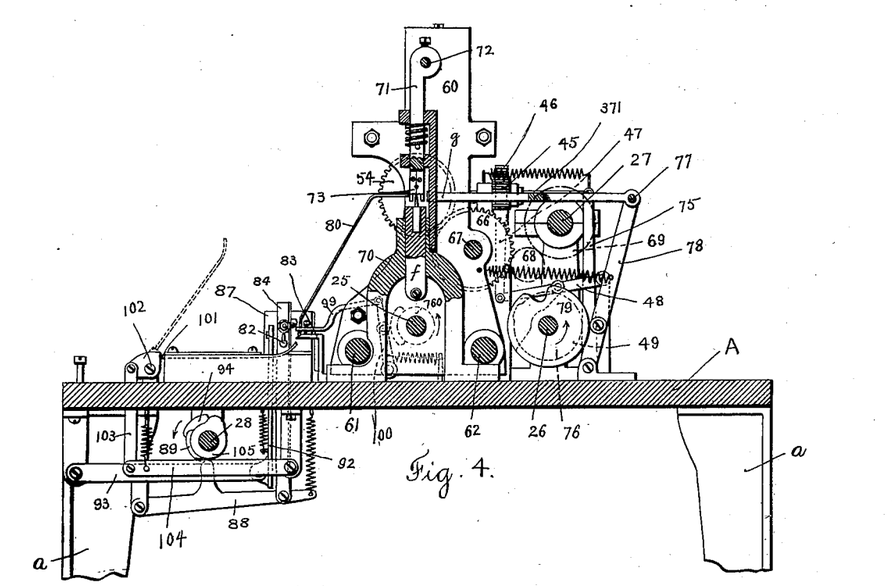
Fig. 4 is a transverse sectional view taken on the line 4 4 of Fig. 1.

The twisting mechanism which I preferably employ comprises two sets of twisting devices 51, which are intermittently moved into contact with the wire blank and are rotated to impart the desired twists to the body portion of the heddle. As illustrated, the twisting devices 51 comprise separate twisting-jaws 52 and 53, having gripping plates or sections $b$, of hardened steel, secured near their ends. A divided gear or pinion 54 is formed integrally with the gripping-jaws 52 and 53, one-half of said pinion being formed with each of said gripping-jaws. The gripping-jaws 52 are provided with overhanging lugs or abutments 56 and 57 and the gripping-jaws 53 are formed with overhanging lugs or abutments 55. Brackets or carriages 60 are movably mounted upon guide-rods 61 and 62 and are normally pushed apart by coiled springs $s$ and $s'$ into engagement with adjustable stops $t$ and $t'$, secured upon the guide-rod 61. The slides 58, mounted in the brackets 60, are normally forced down by adjustable springs 59 and engage, near their their lower ends, with cams 63, fastened on the cam-shaft 25. The slides 58 are provided on their outer faces with lugs or projections 64, adapted to engage the overhanging lugs or abutments 56 and 57 of the twisting-jaws 52. The outer brackets or carriages 60 are provided on their inner faces with extending lugs or projections 65, which are adapted to engage or mesh with the overhanging lugs or abutments 55 of the twisting-jaws 53, and the parts are so timed that when the slides 58 are raised by the cams 63 the aforesaid lugs or abutments will be in engagement, so that the twisting-jaws 52 will rise with the slides 58, while the jaws 53 will be held in engagement with the brackets 60, thus opening the twisting-jaws to receive the wire blank. It is also to be noted that in the construction as thus described the center guide 71 will be caried up and down with the slides 58, and on this account I preferably form the jaw opening or actuating cam 63 with a double rise or step, so that when a heddle has been twisted or formed the center guide 71 will be raised out of the way until the heddle has been removed or pushed away from the heddle-forming mechanism, as hereinafter described. The slides 58 are then allowed to partially descend to bring the center guide 71 into a normal position to control or guide the next wire blank which is fed into the machine. The gears 54 of the twisting-jaws 51 mesh with and are driven by gears 66, fastened on a counter-shaft 67, which is journaled in the brackets or carriages 60, as shown in Fig. 4. The counter-shaft 67 is driven from a shaft 27 by means of a gear 69 and an intermediate 68, as indicated by dotted lines in Fig. 4. The shaft 27 is intermittently turned or actuated from the driving-shaft 29 by means of a peculiar stop-gearing, as hereinafter described, and the twisting-jaws are preferably actuated so that they turn twice or form double twists in the body portion of the heddle. The formation of these twists in the body portion of the heddle will cause a take up or shortening in the length of the heddle and the springs s and s' will yield and allow this to take place without danger of breaking or unduly straining the heddles. The heddles which are thus formed will be left with projecting wire ends, as illustrated in Fig. 8, and I preferably provide devices for removing the heddles from the heddle-forming mechanism and presenting the same to suitable trimming or cutting devices for removing the projecting wire ends.

Figure 10:
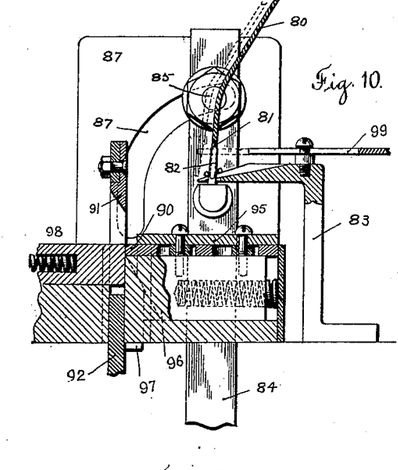
Figs. 10 and 11 are detail sectional views illustrating a finishing or trimming mechanism.

As illustrated, the shanks or spindles 371 of the formers or mandrels 44 are pivoted at their rear ends to arms 75, which rest upon and engage suitable cams 76, which are fastened upon the rear cam-shaft 26, and this construction is so timed that when a heddle has been formed the formers or mandrels 44 will be slightly retracted to free the same from the end eyes of the heddle. Extending down from and formed integrally with the formers or mandrels 44 are guide-rods 80. When the twisting-jaws are open, the heddle will be pushed out of the heddle-forming mechanism, so that it may slide down upon the guide-rods 80. As illustrated, g designates the pushers, which are pivoted at their rear ends upon a rod 77, carried by arms 78, having rollers journaled thereon to engage with and bear against cams 79, secured upon the rear cam-shaft 26. The guide-rods 80 are forked or slotted at their lower end, as at 81, and rest upon brackets, as at 83. A pair of transfer-fingers, as 82, are arranged to enter the forked or slotted portions 81 of the guides 80 and to receive the end eyes of the heddles, as illustrated in Fig. 10. The transfer-fingers 82 are carried by arms 84, having studs 85 near their upper ends, which fit into cam-slots 86 in the inclined brackets 87, secured to the bed-plate A. At their lower ends the arms 84 are connected to arms 88, having projections which bear upon and engage cams 89, fastened on the cam-shaft 28. By means of this construction the heddles will be taken from the ends of the guide-rods 80 and carried by the transfer-fingers 82 into position upon an anvil, as 90, to be operated upon by the trimming or finishing devices. During this operation it is to be noted that the inclination of the brackets 87 will cause the transfer-fingers to spread or be slightly drawn apart, thus stretching or placing the heddle under tension and insuring an accurate positioning of the same.

When a heddle is taken from the end of the guide-rods 80 by means of the transfer-fingers 82, the lower ends of the guide-rods 80 will be sprung or drawn away from the brackets 83, as illustrated in Fig. 10, and I preferably provide reciprocating yokes or guides 99 for directing the guide-rods 80 back into engagement with the brackets 83. As illustrated, the guides 99 are pivoted at their rear ends to arms 100, having rollers journaled thereon, which bear upon and engage cams 760, fastened on the cam-shaft 25.

Figure 11:
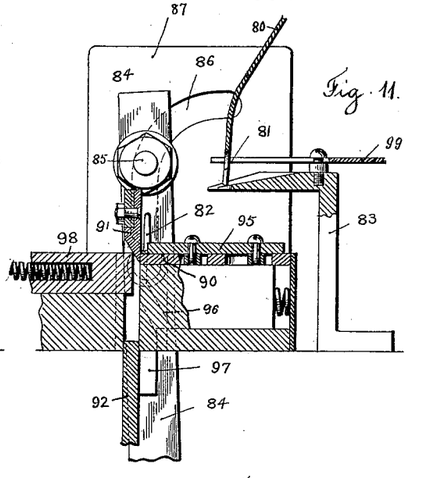

The trimming or finishing mechanism which I preferably employ comprises a knife or blade 91, carried by arms 92. At their lower ends the arms 92 are pivoted upon arms 93, which bear upon and engage cams 94, fastened on the cam-shaft 28. Coöperating with the blade or knife 91 is a spring-slide 95, which is normally actuated by a spring, as shown, to clamp a heddle in position to be engaged by the trimming or finishing mechanism. When the knife-arms 92 are allowed to rise, the spring-slide 95 is forced back by means of cams 97, which are fastened upon the arms 92 and engage with cam-surfaces 96 on the slides 95. A second spring-pressed slide 98 is preferably located upon the opposite side of the trimming-knife 91 and is arranged so that said knife will act as a cam to force the same back, as illustrated in Fig. 11.

The completed heddles may be delivered at the front of the machine by any desired form of delivery mechanism. As illustrated, 101 designates oscillating delivery-arms, which are pivoted, as at 102, and are connected by links 103 to arms 104, which bear upon and engage cams 105, fastened upon the cam-shaft 28.

The gearing for actuating the various groups of instrumentalities embodied in my heddle-machine may be arranged as follows: Fastened on the driving-shaft 29 is a gear 106, which meshes with and drives an intermediate 107, said intermediate 107 meshing with and driving a gear 108, fastened on the cam-shaft 25. Secured near the opposite end of the cam-shaft 25 is a gear 111, which meshes with and drives an intermediate 112, said intermediate 112 meshing with and driving a gear 113, fastened upon the rear cam-shaft 26. As illustrated, the constantly-running feed-rolls 30 and 31 are driven from the cam-shaft 25 by means of a bevel-gear 114, which meshes with and drives a bevel-pinion 115. Turning with the bevel-pinion 115 is a gear 116, which is connected to actuate the feed-rolls by means of intermediates 117, 118, and 119, said intermediate 119 meshing with and driving a pinion 120, fastened upon the shaft of the feed-roll 31. Meshing with and driven from the gear 108 upon the cam-shaft 25 is an intermediate 109, said intermediate 109 meshing with and driving a gear 110, fastened upon the cam-shaft 28.

Figure 16:
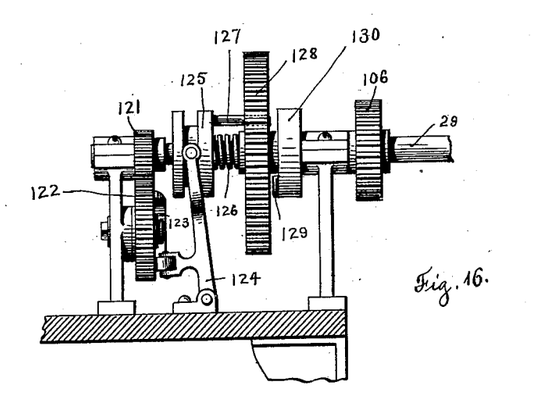
Fig. 16 is a detail view of a stop-gearing which I may employ to intermittently rotate the twisting-jaws.
Figure 17:
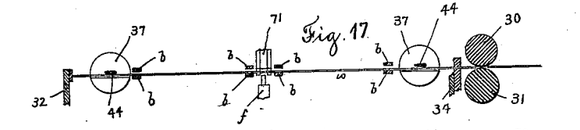
Figs. 17 to 22 are diagrammatic views illustrating the operation of the machine.

The stop-gearing which I preferably employ for intermittently rotating the shaft 27 is most clearly illustrated in Fig. 16. Referring to this figure, 121 designates a pinion carried by the driving-shaft 29, which meshes with and drives a gear 122, which carries a face-cam 123. Loosely mounted on the driving-shaft 29 is a gear 128, which meshes with a gear 131, fastened upon the shaft 27. Loosely mounted on the driving-shaft 29 and turning with the gear 128 by means of a pin 127 is a collar 125. The collar 125 forms substantially one-half of a clutch for intermittently causing the gear 128 to turn with the driving-shaft 29. The other part or fixed section of the clutch is formed by a collar 130, which is fastened upon the driving-shaft 29 and is provided with a lug or projection 129, which is located in position to engage with the pin 127. A spring 126 is arranged to normally hold the pin 127 out of engagement with the lug or projection 129, and the collar 125 or the movable section of the clutch is actuated to bring the pin 127 into position to engage the lug 129 by means of a yoke 124, having a roller which bears upon and engages the face-cam 123.

The various steps in the operation of my heddle-machine are most clearly illustrated in Figs. 17 to 22.

The details of the various groups of instrumentalities have been so fully described in referring to the different parts that it is not thought necessary to describe the operation of the complete machine as a whole.

One feature of advantage in a heddle-machine constructed according to my invention is due to the fact that the parts are so mounted that they may be readily adjusted longitudinally upon the bed-plate to form heddles of different lengths.

I am aware that many changes may be made by those who are skilled in the art in the construction of my heddle-machine, and that many of the parts may be omitted, and that certain of the parts may be used in different locations and in different combinations without departing from the scope of my invention as expressed in the claims. I do not wish, therefore, that the broad claims which I make herein should be at all limited to specific details of construction.

Having thus fully described my invention, what I claim as new, and desire to secure by Letters Patent of the United States, is—

1. In a heddle-machine, the combination of a heddle-forming mechanism comprising end-benders for bending the ends of a wire blank back upon the body portion thereof, and twisting devices and a trimming mechanism for simultaneously cutting off the surplus wire at opposite ends of the heddle, substantially as described.

2. In a heddle-machine, the combination of a heddle-forming mechanism comprising end-benders for simultaneously bending back the ends of a wire blank upon the body portion thereof, and twisting devices, means for feeding a wire blank into position to be acted upon by said heddle-forming mechanism, and a trimming mechanism comprising two simultaneously-actuated blades or knives for cutting off the surplus wire at opposite ends of the heddle, substantially as described.

3. In a heddle-machine, the combination of a heddle-forming mechanism for feeding a wire blank into position to be acted upon by said heddle-forming mechanism, a trimming mechanism comprising two simultaneously-actuated blades or knives for cutting off the surplus wire at opposite ends of the heddle, means for moving the heddles from the heddle-forming mechanism into position to be acted upon by said knives, and a delivery mechanism, substantially as described.

4. In a heddle-machine, the combination of end-benders for simultaneously bending back both ends of a wire blank upon the body portion thereof, and a twisting mechanism for rotating the body portion of the heddle while its ends are held stationary, substantially as described.

5. In a heddle-machine, the combination of a feeding mechanism for feeding a wire blank into position to be acted upon, end-benders for simultaneously bending back both ends of the wire blank upon the body portion thereof, and a twisting mechanism for rotating the body portion of the heddle while its ends are held stationary, substantially as described.

6. In a heddle-machine, the combination of twisting-jaws, end-benders for simultaneously bending back both ends of a wire blank upon the body portion thereof, and mechanism for actuating the twisting-jaws to engage with and rotate the body portion of the heddle while its ends are held stationary, substantially as described.

7. In a heddle-machine, the combination of formers, end-benders for simultaneously bending back both ends of a wire blank, and a twisting mechanism for rotating the body portion of the heddle while its ends are held stationary, substantially as described.

8. In a heddle-machine, the combination of a feeding mechanism for feeding a wire blank into position to be acted upon, end-benders for simultaneously bending back both ends of the wire blank, and a twisting mechanism for rotating the body portion of the heddle while its ends are held stationary, substantially as described.

9. In a heddle-machine, the combination of a heddle-forming mechanism, and a feeding mechanism comprising constantly-running feed-rolls, and a reciprocating cutter arranged to cut wire blanks of the desired length and to then act as a stop for preventing the further advance of the wire by the feed-rolls, substantially as described.

10. In a heddle-machine, the combination of a twisting mechanism, formers, end-benders for bending the ends of a wire blank around said formers into position to be engaged by said twisting mechanism, and an actuating mechanism for said end-benders comprising pinions secured to turn with said end-benders, and vertically-movable cam-actuated racks engaging said pinions, substantially as described.

11. In a heddle-machine, the combination of formers, means for feeding a wire blank into position below said formers, means for moving the formers down into line with the wire blank, and end-benders for bending the ends of the wire blank around said formers to form the end loops of a heddle, substantially as described.

12. In a heddle-machine, the combination of a feeding mechanism for feeding a wire blank into position to be acted upon, movable slides, end-benders and formers carried by said slides, means for moving said slides to bring said formers into line with the wire blank, and means for actuating the end-benders, substantially as described.

13. In a heddle-machine, the combination of a feeding mechanism for feeding a double strand of wire into position to be acted upon, and a reciprocating punch arranged to separate said double strand of wire to form a thread-receiving eye near the middle of the heddle, substantially as described.

14. In a heddle-machine, the combination of a feeding mechanism for feeding a double strand of wire into position to be acted upon, a vertically-movable punch, and a cam for actuating the punch, said punch being arranged to separate the strands of wire to form a thread-receiving eye near the middle of the heddle, substantially as described.

15. In a heddle-machine, the combination of a feeding mechanism for feeding a double strand of wire into position to be acted upon, a twisting mechanism, end-benders for bending the ends of the wire into position to be engaged by the twisting mechanism to form the end loops of a heddle, and a punch for separating the wire strands to form a thread-receiving eye near the middle of the heddle, substantially as described.

16. In a heddle-machine, the combination of a feeding mechanism for feeding a wire blank into position to be acted upon, movable brackets, intermittently-rotating twisting-jaws journaled in said brackets, and springs arranged to normally force said brackets apart and to yield to allow for the take up of the wire during the twisting operation, substantially as described.

17. In a heddle-machine, the combination of a feeding mechanism for feeding a wire blank into position to be acted upon, guide-rods, brackets movably mounted upon said guide-rods, twisting-jaws journaled in said brackets, and springs for normally forcing said brackets apart, substantially as described.

18. In a heddle-machine, the combination of brackets, slides movably mounted in said brackets, and twisting-jaws, the said parts being provided with engaging abutments, whereby said twisting-jaws may be opened by moving said slides, substantially as described.

19. In a heddle-machine, the combination of a twisting mechanism and a stop-gearing for driving said twisting mechanism, said gearing comprising a gear loosely mounted on a driven shaft, a fixed clutch-section carried by said driven shaft, a movable clutch-section loosely mounted on said shaft, and a cam for moving said clutch-sections into engagement, substantially as described.

20. In a heddle-machine, the combination of a twisting mechanism and a stop-gearing for intermittently rotating said twisting mechanism, said gearing comprising a gear loosely mounted on a driven shaft, a fixed clutch-section carried by said driven shaft, a spring-pressed movable clutch-section loosely mounted on said shaft and connected to turn with said gear, a yoke engaging said movable clutch-section, and a face-cam engaging said yoke and adapted to move the sections into engagement, substantially as described.

21. In a heddle-machine, the combination of twisting-jaws and end-benders for forming the end loops of a heddle, said twisting-jaws being provided with inclined grooves for guiding the ends of the wire into proper position to be engaged thereby, substantially as described.

22. In a heddle-machine, the combination of a feed mechanism for feeding the wire blank into position to be acted upon, and a twisting mechanism comprising twisting-jaws, means for opening and closing said twisting-jaws, divided gears carried by said twisting-jaws, and gearing for intermittently rotating said twisting-jaws, substantially as described.

23. In a heddle-machine, the combination of a heddle-forming mechanism comprising formers or mandrels for the end loops of the heddle, cam-actuated devices for withdrawing said formers from the end loops, and cam-actuated pushers for removing the heddles from the heddle-forming mechanism, substantially as described.

24. In a heddle-machine, the combination of a feed mechanism for feeding a wire blank into position to be operated upon, formers, end-benders for bending the ends of the wire blank around said formers to form the end loops of a heddle, said end-benders being provided with recesses, and cam-actuated devices for drawing said formers into said recesses to free the same from the end loops of the heddle, substantially as described.

25. In a heddle-machine, the combination of heddle-forming mechanism, a trimming mechanism for simultaneously cutting off the surplus wire at opposite ends of a heddle, and means for automatically removing the heddles from the heddle-forming mechanism and presenting them to the trimming mechanism, substantially as described.

26. In a heddle-machine, the combination of a heddle-forming mechanism, a trimming mechanism, and guide-rods leading from the heddle-forming mechanism to the trimming mechanism, substantially as described.

27. In a heddle-machine, the combination of a heddle-forming mechanism, a trimming mechanism, guide-rods leading from the heddle-forming mechanism, and transfer-fingers for taking the heddles from the heddle-forming mechanism, and presenting the same to the trimming mechanism, substantially as described.

28. In a heddle-machine, the combination of a heddle-forming mechanism, guide-rods leading from the heddle-forming mechanism and arranged to receive the end loops of a heddle, transfer-fingers for taking the heddles from the guide-rods and presenting the same to the trimming mechanism, said transfer-fingers being guided by inclined brackets so that they will spread or separate to stretch the heddles and present the same accurately in position to be acted upon by the trimming mechanism, substantially as described.

29. In a heddle-machine, the combination of a heddle-forming mechanism, a trimming mechanism, guide-rods leading from the heddle-forming mechanism, transfer-fingers for taking the heddles from the guide-rods and presenting the same to the trimming mechanism, and reciprocating cam-actuated yokes or guides for the guide-rods, substantially as described.

30. In a heddle-machine the combination of a heddle-forming mechanism, a trimming mechanism for simultaneously cutting off the surplus wire at opposite ends of a heddle, means for automatically removing the heddles from the heddle-forming mechanism and presenting them to the trimming mechanism, and a delivery mechanism, substantially as described.

31. In a heddle-machine, the combination of a heddle-forming mechanism, a trimming mechanism, guide-rods leading from the heddle-forming mechanism, transfer-fingers, and cam-actuated delivery-arms for delivering the finished heddles, substantially as described.

32. In a heddle-machine, the combination of a heddle-forming mechanism, a reciprocating cam-actuated blade or knife, means for removing the heddles from the heddle-forming mechanism and presenting the same in position to be acted upon by said blade or knife, substantially as described.

33. In a heddle-machine, the combination of a heddle-forming mechanism, a reciprocating cam-actuated blade or knife, means for removing the heddles from the heddle-forming mechanism and presenting the same to the blade or knife, and spring-pressed slides coöperating with said blade, substantially as described.

34. In a heddle-machine, the combination of a heddle-forming mechanism, a trimming mechanism comprising a reciprocating cam-actuated blade or knife, means for automatically removing the heddles from the heddle-forming mechanism and presenting the same to the trimming mechanism, and a delivery mechanism comprising oscillating cam-actuated arms, substantially as described.

In testimony whereof I have hereunto set my hand in the presence of two subscribing witnesses.

WILLIAM H. GIBBS.

Witnesses:
LOUIS W. SOUTHGATE,
PHILIP W. SOUTHGATE.